United States Patent
Tonno et al.

(10) Patent No.: US 8,578,717 B2
(45) Date of Patent: Nov. 12, 2013

(54) METHOD FOR CONTROLLING THE LOAD VARIATIONS IN A GAS TURBINE

(75) Inventors: Giovanni Tonno, Florence (IT); Mariateresa Paci, Florence (IT); Michele D'Ercole, Florence (IT); Alessandro Russo, Florence (IT); Jesse F. Stewart, Taylors, SC (US); Ya-Tien Chiu, Greer, SC (US); Marco Ulivi, Florence (IT); Antonio Baldassarre, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 692 days.

(21) Appl. No.: 12/332,520

(22) Filed: Dec. 11, 2008

(65) Prior Publication Data

US 2009/0158702 A1     Jun. 25, 2009

(30) Foreign Application Priority Data

Dec. 20, 2007     (IT) .............................. MI2007A2403

(51) Int. Cl.
*F02C 9/46*     (2006.01)
(52) U.S. Cl.
USPC ................................ 60/779; 60/39.1; 60/773
(58) Field of Classification Search
USPC ............ 60/39.1, 39.23, 39.27, 773, 779, 785, 60/795
See application file for complete search history.

(56) References Cited

U.S. PATENT DOCUMENTS

| | | | | |
|---|---|---|---|---|
| 3,868,625 A * | 2/1975 | Speigner et al. | ........... | 60/39.281 |
| 4,403,912 A * | 9/1983 | Pekari et al. | ................... | 415/150 |
| 4,702,070 A * | 10/1987 | Cureton et al. | ................. | 60/785 |
| 4,722,180 A * | 2/1988 | Lindler et al. | ................... | 60/773 |
| 4,756,152 A * | 7/1988 | Krukoski et al. | ............... | 60/773 |
| 5,042,245 A * | 8/1991 | Zickwolf, Jr. | ................... | 60/773 |
| 5,252,860 A * | 10/1993 | McCarty et al. | ................ | 60/773 |
| 5,272,637 A * | 12/1993 | Urushidani et al. | .......... | 701/100 |
| 5,491,970 A * | 2/1996 | Davis et al. | ..................... | 60/776 |
| 5,537,864 A * | 7/1996 | Sood | ........................... | 60/39.27 |
| 5,896,736 A * | 4/1999 | Rajamani | ........................ | 60/773 |
| 6,070,405 A * | 6/2000 | Jerye et al. | ..................... | 60/773 |
| 6,141,951 A * | 11/2000 | Krukoski et al. | ............... | 60/772 |
| 6,328,526 B1 * | 12/2001 | Seki et al. | ......................... | 415/1 |
| 6,895,325 B1 * | 5/2005 | Munson, Jr. | .................... | 60/773 |
| 7,069,727 B2 * | 7/2006 | Hellat et al. | ..................... | 60/777 |
| 2005/0274115 A1 * | 12/2005 | Pearce | ............................. | 60/773 |
| 2007/0227156 A1 * | 10/2007 | Saito et al. | ..................... | 60/772 |

FOREIGN PATENT DOCUMENTS

JP     0642368 A     2/1994
JP     2005233157 A     9/2005

OTHER PUBLICATIONS

Office Action from corresponding JP Application No. 2008-323254, date Mar. 19, 2013.

* cited by examiner

*Primary Examiner* — Gerald L Sung
*Assistant Examiner* — Lorne Meade
(74) *Attorney, Agent, or Firm* — Global Patent Operation

(57) ABSTRACT

A method is described for controlling load variations in a gas turbine. The method comprises reducing the flow of gaseous fuel entering the combustor to a predefined minimum value, if an increase is observed in the rotation regime of said turbine above a predefined maximum value and a total reduction in the load, activating a selective feeding sequence of the burners if the turbine is operating in normal functioning or pre-mixed flame mode, modifying the angulation of the adjustable stator vanes, in order to reduce the speed rate of the compressor, and opening one or more anti-surge valves and one or more overboard bleeds, in order to reduce the air flow at the inlet of the combustor.

8 Claims, 4 Drawing Sheets

METHOD FOR CONTROLLING THE LOAD VARIATIONS IN A GAS TURBINE

BACKGROUND

1. Field

The exemplary embodiments generally relate to a method for controlling the load variations, in particular load reductions, in a gas turbine.

2. Brief Description of Related Developments

The use of gas turbines normally consisting of a multiphase compressor, in which air sucked from the outside is compressed, a combustor, in which the combustion takes place of gaseous fuel added to the compressed air, and a turbine or expander, in which the gases coming from the combustor are expanded, is known for the production of electric energy. The turbine is therefore capable of generating mechanical energy which can be exploited for driving operating machines or for charging electric generators, such as for example, one or more alternators.

A gas turbine destined for the production of electric energy must consequently be able to face sudden disconnections from the electric supply, which can be due, for example, to particular circumstances or inefficiency which can arise in the electric supply. In a situation of this kind, the turbine must be brought to an anomalous but stabile functioning condition, in which the nominal rotation regime is reached, but the alternator does not supply power (a functioning condition called "full speed no load"), until the voltage is re-established in the outside electric supply to restart the service, i.e. reconnection with the electric supply.

During this disconnection phase with the supply, a so-called "load rejection" procedure must be activated as soon as possible, to immediately reduce the power and rotation regime of the turbine to a sufficiently low value so that at least one alternator can self-charge the auxiliary services of the machine or plant to which it is connected. The load rejection procedure is particularly critical for a gas turbine of the double shaft type, as the mechanical inertia of the turbine itself is extremely low and the corrective actions for preventing reaching an excessive rotation regime must be rapid and effective.

SUMMARY

An objective of the exemplary embodiments is to provide a method for controlling load variations in a gas turbine, which allows the turbine to successfully handle total or partial load rejection procedures that can occur during its operative cycle.

A further objective of the exemplary embodiments is to provide a method for controlling load variations in a gas turbine which is capable of preventing a high number of revs being reached by the turbine under disconnection conditions from the supply or in the case of a sudden load reduction, thus avoiding malfunctioning or problems of combustion.

These objectives according to the aspects of the present invention are achieved by providing a method for controlling load variations in a gas turbine as described herein.

In accordance with an exemplary embodiment, the method includes reducing the flow of gaseous fuel entering said combustor to a predefined minimum value, if an increase is observed in the rotation regime of said turbine above a predefined maximum value and a total reduction in the load, activating a selective feeding sequence of said burners if said turbine is operating in normal functioning or premixed flame mode, modifying the angulation of said plurality of adjustable stator vanes in order to reduce the speed rate of said compressor, and opening said one or more anti-surge valves and said one or more overboard bleeds in order to reduce the air flow at the inlet of said combustor.

BRIEF DESCRIPTION OF THE DRAWINGS

The characteristics and advantages for controlling load variations in a gas turbine according to the exemplary embodiments will appear more evident from the following illustrative and non-limiting description, referring to the enclosed schematic drawings in which.

DETAILED DESCRIPTION OF THE EXEMPLARY EMBODIMENT(S)

Figure 1:
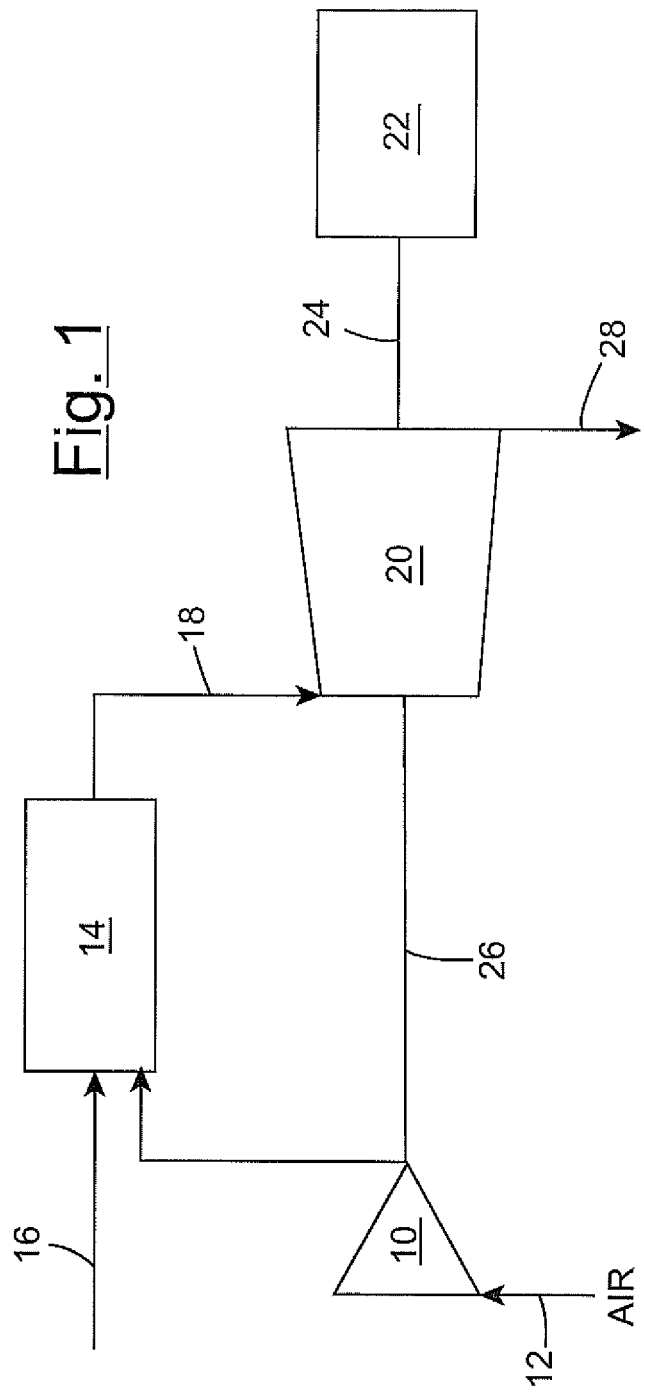
FIG. 1 is a schematic illustration of a gas turbine to which a method for controlling load variations according to the exemplary embodiments can be applied.

With reference to FIG. 1, a schematic illustration of a generic gas turbine is shown. In this example, the gas turbine is of the double shaft type and comprises a compressor 10 capable of compressing the air introduced into the compressor 10 through an inlet duct 12. The compressed air is then sent to a combustor 14 to be mixed with the gaseous fuel coming from a feeding duct 16. The combustion increases the temperature, the speed rate and volume of the gas flow and consequently the energy contained therein. This combusted gas flow is directed, through a duct 18 towards a turbine 20, which transforms the gas energy into work energy that can be exploited for activating operating machines, such as for example a generator 22 connected to the turbine 20 by shaft 24. The turbine 20 also supplies the energy necessary for activating the compressor 10 through shaft 26, whereas the discharge gases are expelled by the turbine 20 through an outlet duct 28.

Figure 2:
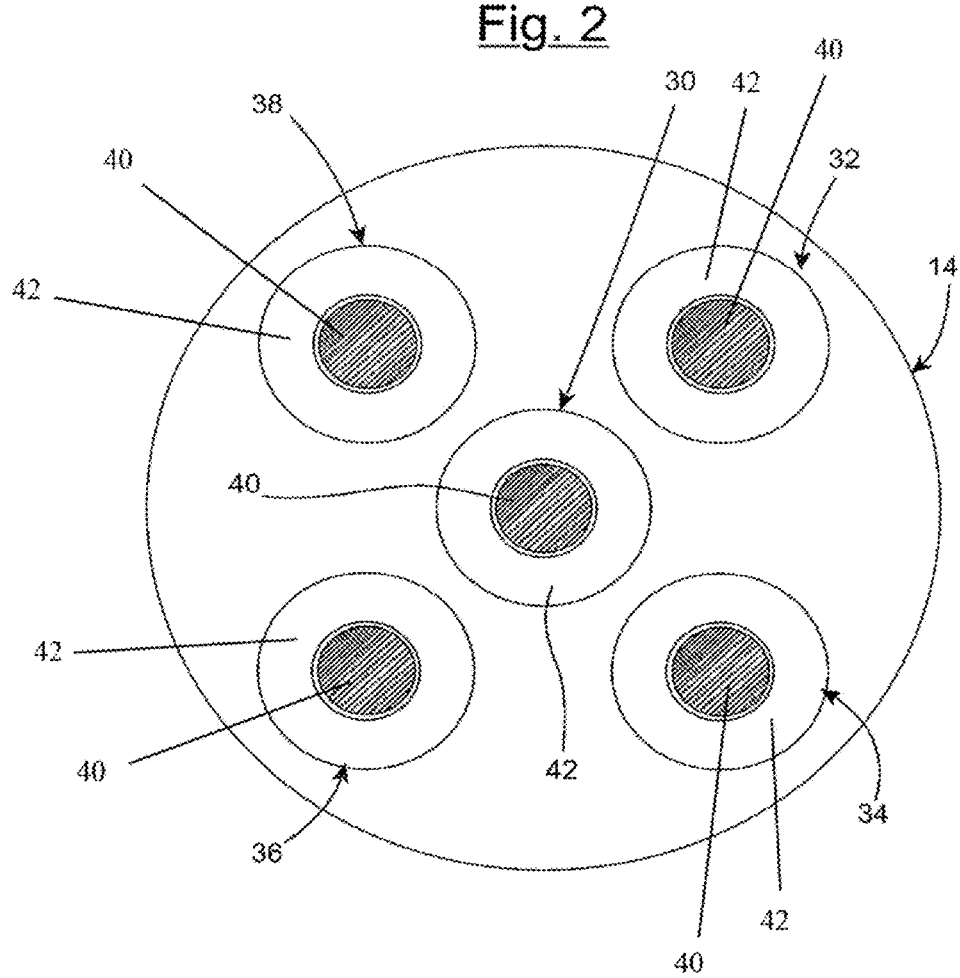
FIG. 2 is a schematic transversal sectional view of an embodiment example of the combustor of the gas turbine of FIG. 1.

FIG. 2 schematically shows, in a transversal section, an exemplary combustor 14. In this example the combustor 14 is of the multitubular type. It is equipped with a plurality of burners 30, 32, 34, 36 and 38 arranged circumferentially around the axis of the combustor 14.

Figure 3:
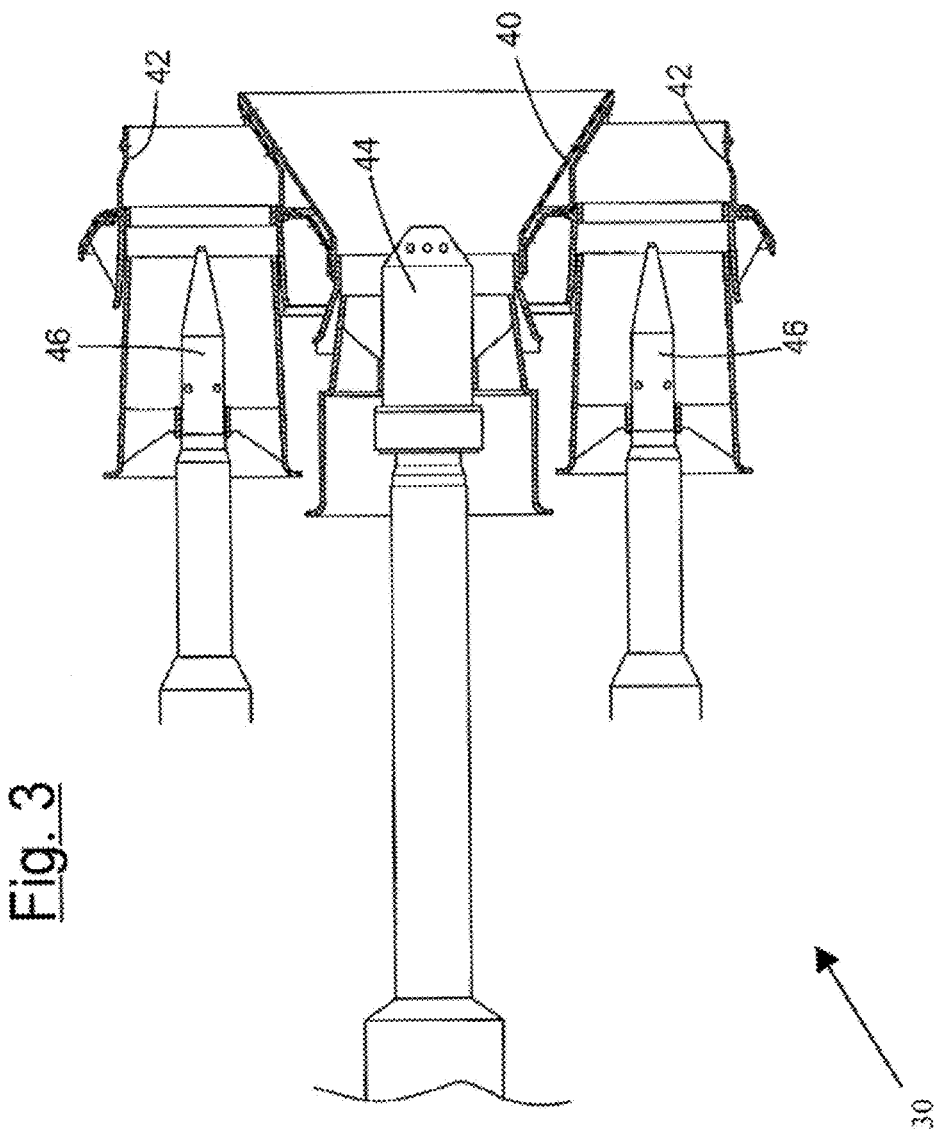
FIG. 3 is a schematic sectional view of the feeding injectors of the gaseous fuel inside the combustor.

Each burner 30-38 is put in connection with at least a first manifold 40 and at least a second fuel manifold 42 and is equipped with at least one pilot injector 44 and one or more main injectors 46 for the adjunction of the gaseous fuel inside the burner itself (FIG. 3). The pilot injector 44, situated in correspondence with the first manifold 40 and in particular centrally, consists of a combustion nozzle capable of functioning in diffusive flame mode and is therefore activated in the ignition phase of the turbine. The main injectors 46, on the other hand, generally arranged around the pilot injector 44 in correspondence with the second manifold 42, are capable of preparing the air/fuel mixture to allow the normal functioning of the turbine, in premixed flame mode.

Figure 4:
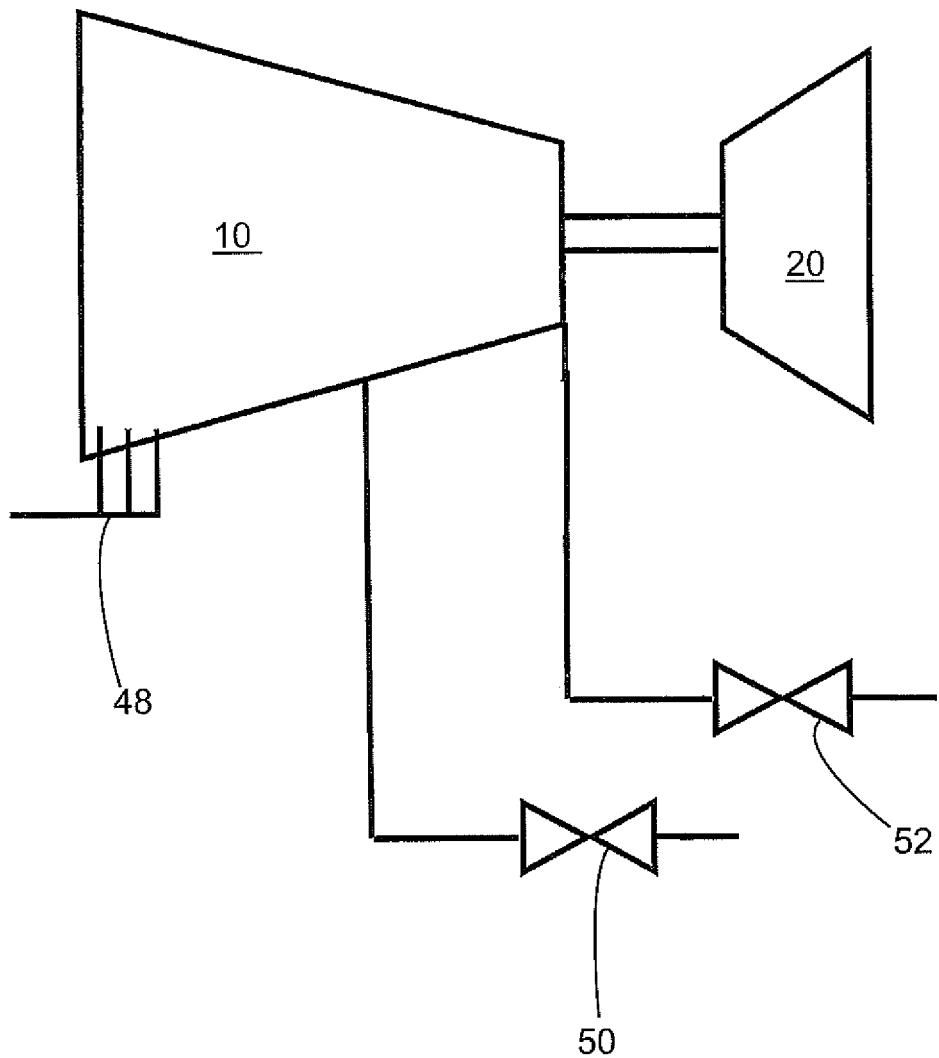
FIG. 4 schematically shows the different components necessary for controlling and handling the functioning of the gas turbine and schematizes the effect.

FIG. 4 schematically shows the components which intervene in the management of the functioning of the machine, i.e. a plurality of adjustable stator vanes 48 (technically known as "inlet guide vanes" or IGV), situated at the inlet of the compressor 10, one or more anti-surge valves 50 (or ASV) and one or more overboard bleeds 52 (or OBB), situated at the outlet of the compressor 10. These components allow the extraction of air from the compressor 10 during the start-up/load rise phases and passage between the diffusive flame mode and premixed flame mode.

The adjustable stator vanes 48 allow the velocity conditions of the compressor 10 to be varied, by suitably rotating to modify the passage area towards the subsequent fixed stator vanes and consequently determining a variation in the air flow-rate. The anti-surge valve 50, normally used during the start-up and shut-down phases of the machine, contribute to regulating the speed rate of the compressor 10, the air-fuel ratio and the flow at the inlet of the turbine 20. Finally, the overboard bleed 52 normally contributes to regulating the air-fuel ratio during the passage between the diffusive flame mode and premixed flame mode, as well as the flow at the inlet of the turbine 20.

If a sudden disconnection of the supply and consequently a sudden overall reduction in the load, takes place, the rotation regime of the turbine 20 will increase and a protection procedure of the turbine itself 20 will therefore have to be activated. The load rejection procedure is therefore activated immediately after the turbine 20 reaches a certain predefined rev value. This procedure comprises the activation of a series of corrective actions, among which the regulation of the fuel flow and of various components of the machine.

More specifically, the procedure first envisages a reduction of the gaseous fuel flow entering the combustor 14 to a predefined minimum value. If the turbine 20 is operating in a normal functioning or premixed flame mode, a selective feeding sequence of the burners 30-38 is subsequently activated, as described in more detail below. If, on the other hand, the turbine 20 is operating in diffusive flame functioning mode, this latter phase is not activated.

Furthermore, the angulation of the adjustable stator vanes 48 is regulated and both the overboard bleed 52 and anti-surge valve 50 are completely opened, in order to reduce the air flow at the inlet of the combustor 14.

Finally, the possibility of switching the functioning mode of the turbine 20, from premixed flame to diffusive flame mode or vice versa, is deactivated.

During the selective feeding sequence of the burners 30-38, a high and predefined quantity of fuel is first supplied to a first burner 30, preferably the maximum quantity possible. If the overall fuel demand on the part of the turbine 20 is greater than the maximum quantity possible of fuel supplied to the first burner 30, a high and predefined quantity of fuel is supplied to a second burner 32, until the maximum quantity of fuel that can be supplied to the second burner 32 has been reached. If the overall fuel demand on the part of the turbine 20 is once again greater than the maximum quantity possible of fuel supplied to the first burner 30 and second burner 32, fuel will be fed to a third burner 34.

Once the rotation regime of the turbine 20 has been restored to below the predefined maximum value, the control logic that governs functioning at normal speed rate will substitute that of the load rejection. More specifically:

the fuel flow will continue to be governed by the fuel demand requested by the electronic control system of the turbine 20;

the fuel supply will continue only through the first burner 30. If the machine is operating in diffusive flame mode, this action will not be activated;

the adjustable stator vanes 48, the anti-surge valve 50 and the overboard bleed 52 will return to functioning according to the standard logic used in the normal functioning mode.

Finally, after the rotation speed rate of the turbine 20 has dropped until it is close to the nominal or operating value of the turbine 20, a temperature control is effected inside the combustor 14. If the control is successful and the turbine 20 is operating in normal functioning or premixed flame mode, transfer to the diffusive flame functioning mode is activated, thus completing the load rejection procedure.

At the end of the load rejection procedure, the turbine will therefore be in an empty functioning or "full speed no load" condition, in which the combustor is operating in a diffusive flame mode.

In the case of sudden partial load reductions, flame loss in the combustor 14 and dynamic instability phenomena in the combustor 14 itself are avoided by only partially applying the logic described above. In particular, only the partialization of the air flow and redistribution of the fuel flow in the combustor 14 are applied, whereas neither the position of the adjustable stator vanes 48, nor the open/closed position of the anti-surge valves 50 and overboard bleeds 52, are modified.

It can thus be seen that the method for controlling load variations in a gas turbine according to the exemplary embodiments achieves the objectives specified above. Experimental tests have in fact demonstrated that a gas turbine to which the control method according to aspects of the invention have been applied, has succeeded in successfully managing a series of load rejection procedures, both total and partial, without there being any problems of combustion or malfunctioning on the machine.

The method for controlling load variations in a gas turbine of the exemplary embodiments thus conceived can in any case undergo numerous modifications and variants, all included in the same inventive concept.

The protection scope of the invention is therefore defined by the enclosed claims.

What is claimed is:

1. A method for avoiding malfunctions during load reductions in a double shaft gas turbine of the type comprising at least one compressor, capable of compressing the air introduced into it through an inlet duct, at least one combustor, in which said compressed air is mixed and combusted with a gaseous fuel coming from a feeding duct, and at least one turbine, capable of transforming the energy of the combusted gas coming from said combustor into work energy which can be exploited for activating one or more operating machines, wherein said combustor is equipped with a plurality of burners and wherein said compressor is equipped with a plurality of adjustable stator vanes, one or more anti-surge valves and one or more overboard bleeds, the method comprising performing the following steps in sequence:
   (a) reducing a flow of the gaseous fuel entering said combustor to a predefined minimum value, if an increase is observed in the rotation regime of said turbine above a predefined maximum value and a total reduction in the load;
   (b) modifying the angulation of said plurality of adjustable stator vanes in order to reduce the speed rate of said compressor;
   (c) opening said one or more anti-surge valves and said one or more overboard bleeds in order to reduce an air flow at an inlet of said combustor; and
   (d) supplying a maximum quantity possible of the gaseous fuel to one or more burners in order to cover an overall demand for the gaseous fuel of said turbine and to avoid a flame loss if said turbine is operating in premixed flame mode.

2. The method according to claim 1, further comprising deactivating, through an electronic control system of said turbine, the possibility of switching a working mode of said turbine from premixed flame mode to diffusive mode or vice versa.

3. The method according to claim 1, further comprising supplying a predefined quantity of gaseous fuel to a first burner during said selective feeding sequence of said burners.

4. The method according to claim 3, further comprising supplying a predefined quantity of gaseous fuel to a second burner if the overall demand for gaseous fuel on the part of said turbine is greater than the maximum quantity possible of gaseous fuel supplied to said first burner.

5. The method according to claim 4, further comprising supplying a predefined quantity of gaseous fuel to at least a third burner if the overall demand for gaseous fuel on the part of said turbine is greater than the maximum quantity possible of gaseous fuel supplied to said first burner and said second burner.

6. The method according to claim 1, further comprising:
managing the flow of said gaseous fuel with an electronic control system of said turbine once the rotation regime of said turbine has been restored to below said predefined maximum value;
supplying gaseous fuel only to a first burner if said turbine is operating in a premixed flame mode; and
activating said plurality of adjustable stator vanes, said one or more anti-surge valves and said one or more overboard bleeds according to a standard logic used in the premixed flame mode of said turbine.

7. The method according to claim 6, further comprising maintaining the supply of said predefined quantity of gaseous fuel to said first burner, a second burner and at least a third burner if said turbine is operating in diffusive flame mode.

8. The method according to claim 6, further comprising:
effecting a temperature control inside said combustor after the rotation regime of said turbine has dropped substantially to its nominal or operating value; and
activating the transfer from the functioning mode of said turbine from premixed flame to diffusive flame if said temperature control is successful and if said turbine is operating in premixed flame mode.

\* \* \* \* \*